FIG.1.

INVENTORS
Leland A. Schlabach &
Laszlo Gyugyi

United States Patent Office 3,444,451
Patented May 13, 1969

1

3,444,451
CLOSED LOOP MOTOR CONTROL SYSTEM
Leland A. Schlabach and Laszlo Gyugyi, Pittsburgh, Pa., assignors to Westinghouse Electric Corporation, Pittsburgh, Pa., a corporation of Pennsylvania
Filed Aug. 26, 1966, Ser. No. 575,386
Int. Cl. H02p 7/62
U.S. Cl. 318—227                             10 Claims This invention relates to control systems for alternating current drive motors, and more particularly to a completely solid-state alternating current motor control system which converts direct current into an alternating current of variable voltage and frequency.

As is known, a drive system for a three-phase alternating current electric motor requires means for converting three-phase 60-cycle power into an output of variable voltage and frequency. Furthermore, since the load for the drive system is an alternating current motor, the system output voltage must vary in a direct relationship with the output frequency of operation to obtain full power from the motor and to avoid saturating the motor.

The present invention is concerned with an alternating current motor control system of the type employing a solid-state three-phase bridge inverter in which variation of output voltage is achieved by varying the inverter circuit conduction interval. In such a system, the line-to-line voltage waveforms on the motor will consist of the sum of the inverter output voltage and that voltage regenerated and supplied by the motor. The sum of these voltages must be maintained at a desired value, and since the regenerated voltage is only partially related to the inverter output voltage, a fast-acting closed loop regulating circuit is required to automatically maintain the system output voltage. That is, a closed system is required since it would be almost impossible to adjust an open loop type voltage regulating system to obtain reasonable voltage regulation under variations of system output frequency, motor speed, and motor load simultaneously. Furthermore, closed loop voltage regulating circuits utilizing conventional linear control circuit techniques are not satisfactory since the desired performance cannot be obtained due to inherent linear control circuit delays.

Accordingly, as one object, the present invention provides a solid-state motor control system for an alternating current motor utilizing a non-linear closed loop regulating circuit.

Another object of the invention is to provide a low cost variable speed alternating current motor control system which converts three-phase 60-cycle power into the variable voltage and frequency needed to drive an alternating current motor.

Another object of the invention is to provide an alternating current motor control system of the type described employing current limiting means. Under normal starting conditions, the motor input current may be as much as five to ten times the normal full load input current. While the inverter can be designed to supply these large currents, it is more desirable to reduce the high motor starting currents and the corresponding mechanical stresses in the motor. Accordingly, the current limiting means is provided to reduce the starting voltage.

The above and other objects and features of the invention will become apparent from the following detailed description taken in connection with the accompanying drawings which form a part of this specification, and in which:

2

Figure 1:
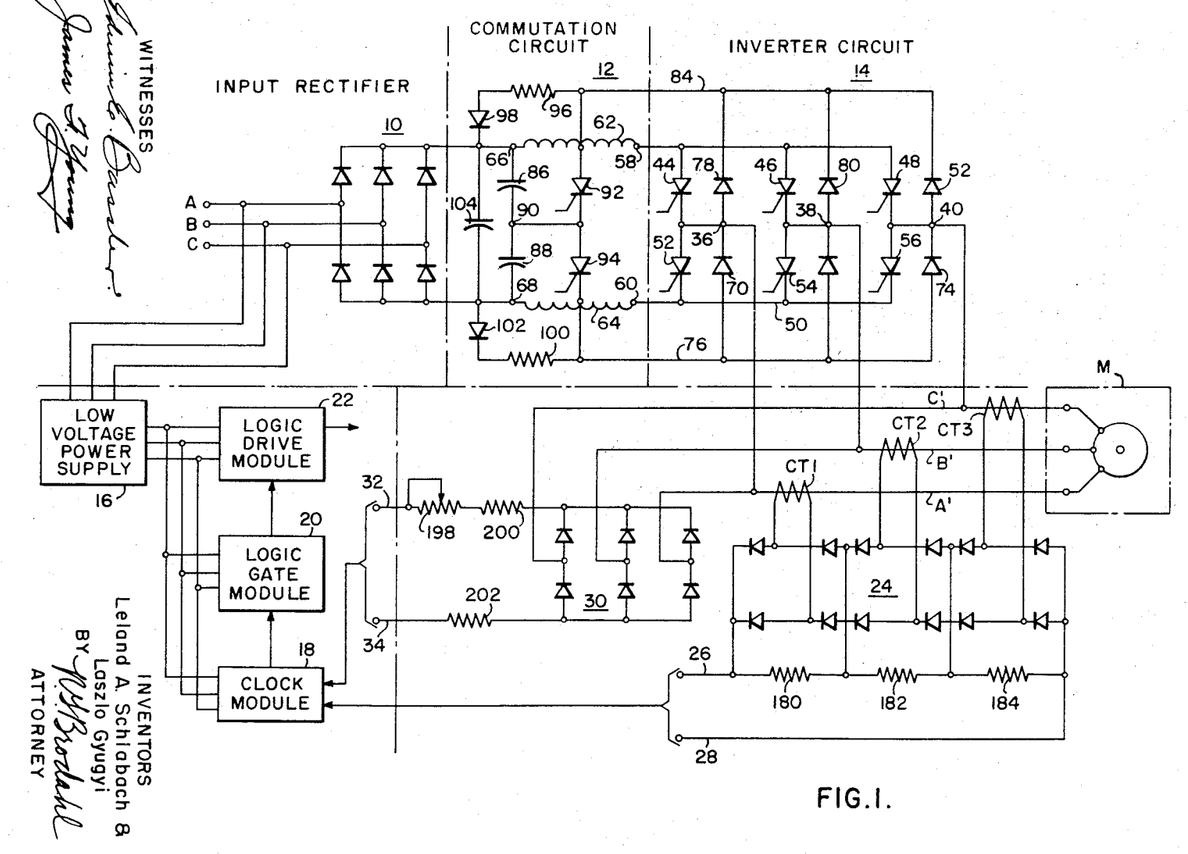
FIGURE 1 is an overall block and schematic circuit diagram of the control system of the invention.

With reference now to the drawings, and particularly to FIG. 1, the power supply system for an alternating current motor M is made up of a three-phase full-wave bridge rectifier 10, a front end commutation circuit 12 and a three-phase bridge inverter circuit 14. The commutation circuit 12 and inverter circuit 14 per se are the subject of copending application Ser. No. 520,497, filed Jan. 13, 1966 and assigned to the assignee of the present application. The three-phase full-wave bridge rectifier 10 is conventional in construction and serves to rectify three-phase 60-cycle alternating current power applied to leads A, B, and C.

The leads A, B and C are also connected through a low voltage power supply 16 to a clock module 18, a logic gate module 20 and a logic drive module 22 which supplies firing pulses to the thyristors in the inverter circuit 14 in a manner hereinafter described.

The output of the inverter circuit 14 is applied through leads A', B' and C' to the three phases or windings of the motor M. Respectively coupled to the three leads A', B' and C' are three current transformers CT1, CT2 and CT3. The current transformers CT1, CT2 and CT3, in turn, are connected through a rectifying network 24 to leads 26 and 28, the arrangement being such that the voltage appearing across leads 26 and 28 will vary as a function of the motor input current. This voltage is utilized in the clock module 18 in a manner hereinafter described to control the inverter circuit 14, particularly during start-up conditions when high load currents persist. The leads A', B' and C' are also connected through a three-phase bridge rectifier 30 to leads 32 and 34, the voltage across the leads 32 and 34 varying in magnitude as a function of line voltage. This voltage is also applied to the clock module 18 to control the inverter 14, as will hereinafter be explained in detail.

The inverter 14 comprises a plurality of output terminals 36, 38 and 40 connected to a positive bus 42 by means of thyristors 44, 46 and 48, and to a negative, grounded bus 50 by means of thyristors 52, 54 and 56. The thyristors 44, 46 and 48 are polarized to conduct current from the positive bus 42 to the output terminals 36, 38 and 40; while the thyristors 52, 54 and 56 are polarized to conduct current from the output terminals 36, 38 and 40, respectively, to the negative bus 50. The buses 42 and 50 are connected to end terminals 58 and 60 of reactors 62 and 64, respectively, the other end terminals 66 and 68 of the reactors being connected to the direct current output of input rectifier 10.

Diodes 70, 72 and 74, respectively, connect a reactive current carrying bus 76 to the output terminals 36, 38 and 40. Similarly, diodes 78, 80 and 82, respectively, connect the output terminals 36, 38 and 40 to a second reactive current conducting bus 84. Capacitors 86 and 88 are connected in series between the end terminals 66 and 68 and are provided with a common center connection 90. The center connection 90 is connected through thyristor 92 to a center tap on the reactor 62. Similarly, the center connection 90 is connected through thyristor 94 to a center tap on the reactor 64.

When thyristor 92 is conductive, the capacitor 86 discharges through the left-hand portion of the reactor 62. Similarly, when thyristor 94 becomes conductive, the capacitor 88 discharges through the left-hand side of the reactor 64.

In shunt with the left-hand side of the reactor 62 are a resistor 96 and diode 98 in series. Similarly, a resistor 100 and diode 102 are connected in shunt with the left-hand side of the reactor 64. The capacitor 104 connected between terminals 66 and 68 is utilized for smoothing the rectified voltage derived from rectifier 10.

Upon connection of a source of three-phase power to the rectifier 10, each of the capacitors 86 and 88 will charge to one-half the magnitude of the rectified voltage at the output of rectifier 10. Timing pulses, the function of which is hereinafter described in greater detail, are applied to the gates of thyristors 92 and 94 to alternately render them conducting. When thyristor 92 conducts, for example, capacitor 86 discharges, thereby lowering the potential on bus 42. At the same time, the capacitor 88 charges through thyristor 92 and the left-hand side of the reactor 62. Similarly, when the thyristor 94 is rendered conducting by the application of a timing pulse to its gate electrode, capacitor 88 discharges while capacitor 86 charges to almost the full-line voltage through thyristor 94 and the left-hand side of reactor 64. In this manner, one set of thyristors 44–48 will be cut-off when capacitor 86 is discharged, while the other set of thyristors 52–56 will be cut-off when capacitor 88 discharges and vice versa.

Figure 2:
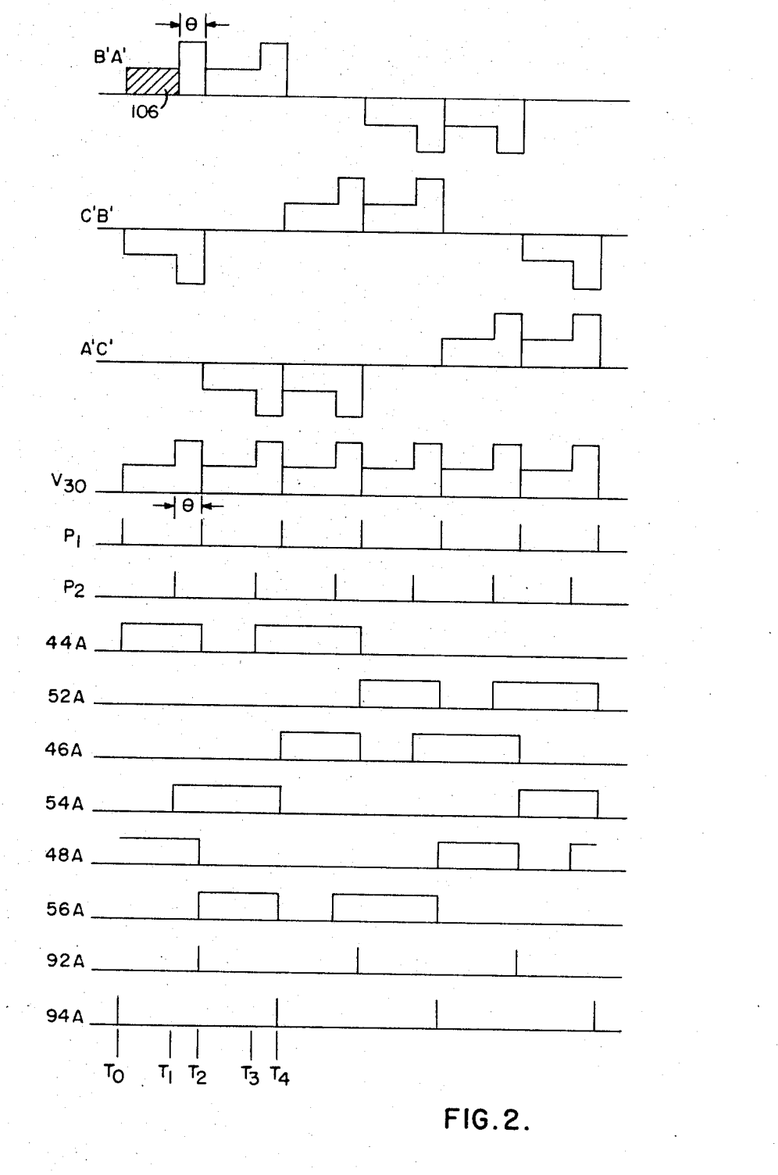
FIG. 2 illustrates waveforms appearing at various points in the circuit of FIG. 1.

The operation of the circuit can perhaps best be understood by reference to the waveforms of FIG. 2. Waveforms B'A', C'B' and A'C' represent the respective line-to-line voltages between the leads or phases A', B' and C', respectively. As was mentioned above, the system output voltage must vary in a direct relationship with the output frequency of operation of the motor to obtain full power and also to avoid saturating the motor. In accordance with the present invention, this is obtained by varying the inverter circuit conduction interval, indicated by the angle $\theta$ in FIG. 2, during which time the inverter circuit 14 applies power to the motor M. It will be noted that there is a voltage at the motor terminals prior to the inverter circuit conduction interval (shown crosshatched on waveform B'A' and identified by the reference numeral 106). This voltage is regenerated and supplied by the motor and its magnitude depends upon the inverter output voltage, motor speed and load. Since the magnitude of the regenerated voltage will vary, the correct relationship between output voltage and output frequency must be maintained by varying the angle $\theta$ to compensate for variations in the regenerated voltage. The angle $\theta$ is determined by the phase lag between pulses in waveforms $P_1$ and $P_2$, shown in FIG. 2, which are derived from the clock module 18 in a manner hereinafter described. This phase lag between the pulses $P_1$ and $P_2$ (i.e., the angle $\theta$), in turn, is dependent upon the magnitude of the feedback signal from either circuit 24 or circuit 30.

The pulses in waveforms $P_1$ and $P_2$, when applied to the logic gate module circuit 20 and logic drive module 22, generate the gate drive currents for thyristors 44–48 and 52–56 in inverter circuit 14. The gate drive currents for thyristors 44–48 and 52–56 are illustrated in FIG. 2 and identified as waveforms 44A, 52A, 46A, 54A, 48A and 56A. The gate drive current illustrated by waveform 44A, for example, is applied between the gate and cathode of the thyristor 44; and, similarly, waveform 52A is applied between the gate and cathode of thyristor 52. As the phase lag between the pulses in waveforms $P_1$ and $P_2$ varies, thereby varying the angle $\theta$, the pulse widths of the current pulses in waveforms 44A–56A will also vary to vary the conduction periods of the various thyristors in inverter circuit 14.

Finally, the pulses $P_1$ and $P_2$ are also utilized to obtain firing pulses for the thyristors 92 and 94 illustrated as waveforms 92A and 94A in FIG. 2. These pulses, in effect, are in phase with the pulses in waveform $P_1$, but of one-half the frequency, the pulses in waveform 94A being intermediate of those in waveform 92A.

In the operation of the circuit, let us assume that at time $T_0$ shown in FIG. 2, a pulse in waveform 94A is applied to the thyrister 94. This causes the capacitor 88 to discharge and capacitor 86 to charge. At time $T_0$, gate drive current is supplied to thyristors 44 and 48 as shown by waveforms 44A and 48A. All other thyristors are blocked. Accordingly, the regenerated voltage of the motor appears between leads B' and A', shown by waveforms B'A' in FIG. 2, and between leads C' and B' shown by waveform C'B'.

The foregoing condition will exist until time $T_1$ is reached, whereupon gate drive current is supplied to thyristor 54 (waveform 54A), as well as thyristors 44 and 48. Current now flows from bus 42 through thyristor 48, output terminal 40, lead C', the motor M, lead B', terminal 38 and thyristor 54 to the bus 50. Similarly, the current flows from bus 42 through thyristor 44, output terminal 36, lead A', the motor M, lead B', terminal 38 and thyristor 54 to lead 50. The result, of course, is that the voltage in waveforms B'A' and C'B' increases for the time period $\theta$. This condition persists until time $T_2$ is reached, whereupon waveforms 44A and 48A fall, and gate drive current is no longer applied to the thyristors 44 and 48. At the same time, a pulse in waveform 92A is applied to thyristor 92 to discharge capacitor 86 and charge capacitor 88. Consequently, the anodes of thyristors 44, 46 and 48 are reduced to substantially below the potential of the negative bus 50. This, of course, causes the formerly conducting thyristors 44 and 48 to terminate their conduction for a period which exists as long as the anodes thereof are negative with respect to their cathodes.

At time $T_2$, gate drive current is supplied to thyristors 54 and 56 as illustrated by waveforms 54A and 56A; however no current is supplied to the motor M during this time since gate drive current is applied to none of the thyristors 44–48. However, at time $T_3$, and as shown by waveform 44A, gate drive current is supplied to the thyristor 44. Consequently, at time $T_3$, current will flow from bus 42 through thyristor 44, terminal 36, lead A', the motor M, lead B', terminal 38 and thyristor 54 to bus 50. Likewise, current will flow through the thyristor 44, terminal 36, lead A', the motor M, lead C', terminal 40 and thyristor 56 to the bus 50. The result, of course, is that the voltage between leads B' and A', and that between leads A' and C' increases as indicated by waveforms B'A' and A'C' in FIG. 2. This increased voltage level will continue until time $T_4$ where the gate drive current is removed from thyristors 54 and 56 (waveforms 54A and 56A), and a pulse in waveform 94A is applied to the thyristor 94. When thyristor 94 fires, capacitor 88 is discharged and capacitor 86 is charged, whereupon the potential on the cathodes at thyristors 52, 54 and 56 is reduced such that the previously-conducting thyristors 54 and 56 now are cut-off.

The time between $T_1$ and $T_2$, as well as that between $T_3$ and $T_4$, is equal to the time period $\theta$; and it will be appreciated that this time period is dependent upon the phase positions of the pulses in waveforms 44A through 94A shown in FIG. 2. These phase positions, in turn, are dependent upon the phase difference between the pulses shown in waveforms $P_1$ and $P_2$. As will be seen, the phase difference between pulses $P_1$ and $P_2$ is dependent upon the control voltages on leads 32, 34 and 26, 28. The feedback voltage rectified by circuit 30, for example, is shown in FIG. 2 as waveform $V_{30}$. As this voltage increases or decreases, the angle $\theta$ will increase or decrease correspondingly to vary the system output voltage in direct relationship with the output frequency of operation.

Thus, a short positive pulse $P_1$ is supplied whenever the end of an inverter circuit conduction interval $\theta$ should occur. The $P_2$ pulse is also positive and of short duration, but it is supplied at the beginning of each inverter circuit conduction interval $\theta$. The manner in which these pulses are generated will now be described in connection with FIG. 3.

Figure 3:
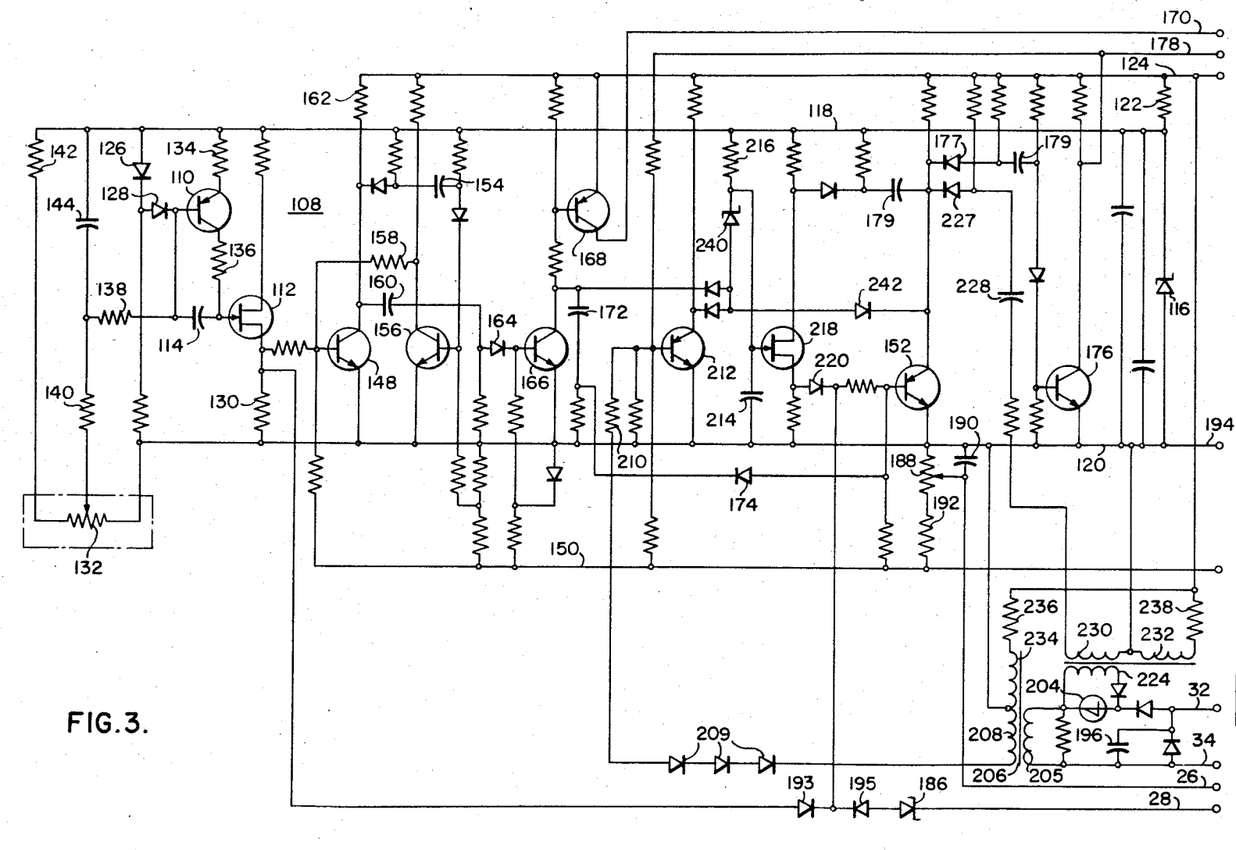
FIG. 3 is a detailed schematic circuit diagram of the clock module shown in block form in FIG. 1.

The clock module 18 is shown in detail in FIG. 3 and includes a unijunction oscillator, generally indicated by the reference numeral 108, and made up of transistors 110 and 112 along with the associated resistors, capacitors and diodes shown. In operation, the capacitor 114 is charged nearly to the stabilized voltage of a Zener diode 116 shown at the right side of FIG. 3 and connected between leads 118 and 120. The lead 120 is grounded, as shown, whereas lead 118 is connected through resistor 122 to a source of B+ potential at terminal 124.

Charging of capacitor 114 occurs through diode 126, diode 128, the unijunction transistor 112 and resistor 130. When the capacitor 114 is thus charged nearly to the stabilized voltage of the Zener diode 116, the unijunction transistor 112 switches on and generates a pulse across resistor 130. The length of time between output pulses from the circuit and consequently, the operating frequency, is determined by the time taken to discharge the capacitor 114 which is controlled by the setting of a potentiometer 132 which is the main frequency or speed control element for the entire system.

The discharge path for the capacitor 114 is through resistor 134, transistor 110, resistor 136, resistors 138 and 140, the potentiometer 132 and resistor 142. The maximum frequency of operation of the oscillator 108 is determined by the total resistance of resistors 138 and 140. The minimum frequency, in turn, is determined by the resistance value of resistor 142. Capacitor 144 is added to the circuit to limit the rate at which the system operating frequency can be changed. In this manner, the amount of power which a motor may regenerate back into the inverter circuit 14 of FIG. 1 is reduced to a tolerable level.

The output pulses from oscillator 108 are applied through resistor 46 to the base of transistor 148, and also through lead 150 to the gate of the Gate Controlled Switch 152. When the oscillator pulses are applied to the base of transistor 148 and the gate of GCS 152, they both turn on. Under normal operating conditions, the inverter circuit does not operate at full conduction and GCS 152 is turned on by other circuitry prior to arrival of the oscillator pulse, as will hereinafter be described. When full conduction is necessary, however, the conduction intervals $\theta$ are determined by the oscillator pulse turning the GCS 152 on.

Through the coupling effect of capacitor 154, transistor 156 is forced to turn off when transistor 148 fires and will stay off until the capacitor 154 becomes discharged. During this length of time, transistor 148 is forced to remain on by the resistive coupling path through resistor 158. In this respect, the two transistors 148 and 156 operate as a type of multivibrator wherein one transistor is cut-off while the other conducts, and vice versa. As will be seen, the length of time required to discharge the capacitor 154 (i.e., the time during which transistor 156 is cut-off), is the minimum length of time that occurs between commutation of the inverter circuit and the beginning of the following conduction interval (i.e., the time between the $\theta$ conduction intervals shown in FIG. 2). This time interval was necessary in some inverter circuits so that the associated trapped energy can be properly dissipated.

After the delay time determined by the discharge of capacitor 154, transistors 156 and 148 return to the conducting and blocking states, respectively. The capacitor 160 then becomes charged through resistor 162, diode 164 and transistor 166. This turns on transistor 166 momentarily and, in turn, momentarily turns on transistor 168. The collector of transistor 168 is connected to lead 170, and the pulses on lead 170 comprise those pulses shown as waveform $P_2$ in FIG. 2. Thus, it is these pulses which initiate the inverter circuit conduction interval $\theta$. The frequency of these pulses is determined by the oscillator circuit 108 and this frequency, in turn, is dependent upon the setting of potentiometer 132. Variation in the conduction interval $\theta$ is then achieved by varying the phase relationship of the pulses $P_1$ with respect to pulses $P_2$ in a manner hereinafter described. When a $P_2$ pulse is applied to lead 170, a corresponding negative pulse is applied through capacitor 172 and diode 174 to the base of transistor 152. This causes the GCS 152 to return to the blocking state.

After the inverter circuit conduction interval $\theta$ begins, its termination is determination by whichever of the following conditions is attained first:

(a) The inverter output current reaches the maximum allowable value as determined by circuit 24 shown in FIG. 1.

(b) The inverter output volt-seconds desired is reached as determined by circuit 30 of FIG. 1.

(c) The maximum conduction interval time length is reached. This occurs when an oscillator output pulse from unijunction transistor 112 causes the GCS 152 to turn on. Whenever any one of the foregoing conditions occur, GCS 152 will be turned on which, in turn, forces transistor 176 to turn off momentarily through diode 177 and capacitor 179. When transistor 176 is turned off momentarily, a pulse is produced on lead 178, and these pulses comprise those in waveform $P_1$ shown in FIG. 2. It is these pulses, therefore, which terminate the inverter conduction interval $\theta$.

The operation of the inverter output current limiting circuit, responsive to the output of current feedback circuit 24 shown in FIG. 1, can be described as follows: A direct current signal proportional to the sum of the inverter output currents is obtained from three series connected resistors 180, 182 and 184 shown in FIG. 1. These resistors are supplied by the inverter output current transformers CT1, CT2 and CT3 through the rectifier circuit 24, the resulting voltage on leads 26 and 28 being proportional to output current. When the inverter output current reaches a predetermined maximum value as determined by the safe operating conditions for the motor, the feedback on leads 26 and 28 will be sufficient to overcome the Zener diode 186 shown in FIG. 3 as well as the voltage across resistor 188 and capacitor 190, thereby forcing transistor 152 to turn on. The turn on of GCS 152, in turn, causes transistor 176 to turn off, thereby producing a $P_1$ pulse on lead 178. The maximum value of inverter output current at which the circuit will cause commutation can be adjusted by adjusting the variable resistor 188 which, as shown, is in series with the resistor 192 between ground and lead 150 which is connected to a source of negative potential at terminal 194. Diodes 193 and 195 serve as blocking diodes between Zener diode 186 and unijunction transistor 112.

A signal proportional to inverter output voltage is fed back through leads 32 and 34 and applied across capacitor 196. Resistors 198, 200 and 202 shown in FIG. 1, along with capacitor 196 of FIG. 3, form an integrating circuit in which the voltage across the capacitor 196 is proportional to the system output volt-seconds during each 60° operating interval. When the desired system output volt-seconds is reached during any one of the 60° operating intervals, the voltage on capacitor 196 is sufficient to force the Shockley diode 204 to switch on. Capacitor 196 then discharges through the primary winding 205 of transformer 206. The secondary winding 208 of transformer 206, in turn, supplies sufficient reverse voltage through diodes 209 and resistor 210 to cause a normally conducting GCS 212 to turn off. With transistor 166 and GCS's 212 and 152 all cut-off, the capacitor 214 in series with resistor 216 between leads 118 and 120 charges rapidly, thereby causing the unijunction transistor 218 to turn on. When unijunction transistor 218 turns on, a pulse is supplied via diode 220 and resistor 222 to the base of GCS 152, thereby causing the GCS 152 to turn on, and the transistor 176 to turn off. This, in turn, produces a $P_1$ pulse on the lead 178, causing the period $\theta$ shown in FIG. 2 to terminate. Thus, from the foregoing description, it can be seen that GCS 152 is turned on and transistor 176 turned off by either: (1) a pulse from oscillator 108 (full conduction interval), (2) a pulse from Zener diode 186 (current control), or (3) a pulse from unijunction transistor 218 (volt-seconds control).

In shunt with the Shockley diode 204 is a winding 224 on transformer 226. The transformer 226 and its associated circuitry are utilized to insure that the capacitor 196 always starts at zero voltage at the beginning of each operating 60° interval. By capacitive coupling from the anode of GCS 152 through diode 227 and capacitor 228 to winding 230 on transformer 226, a voltage sufficient to break over the Shockley diode 204 is supplied at the end of each commutation interval, providing a discharge path for capacitor 196 as needed. Winding 232 on transformer 226 and winding 234 on transformer 206 are supplied with sufficient current from the leads 118 and 120 through resistors 236 and 238 to reset the cores of the transformers 226 and 206.

The circuitry including elements 212 and 218 is to insure that inverter circuit commutation cannot occur before conduction begins during a 60° operating interval. Otherwise, the inverter circuit could be faulted under some transient operating conditions. One example of such an operating condition is that which exists when the system output frequency is being reduced to an induction motor which will force energy back into the inverter circuit. In this case, the system output voltage may be quite high even though the inverter conduction interval is at a minimum. Since the output voltage is high, the voltage feedback would cause commutation before conduction actually begins during a 60° operating interval. When this situation occurs, GCS 212 is forced into the blocking state, but capacitor 214 does not become fully charged since the Zener diode 240 is still connected to ground through diode 242 and GCS 152. When the conduction interval does begin and GCS 152 is returned to the blocking state as a consequence, then capacitor 214 will quickly become fully charged, causing unijunction transistor 218 to switch on. A pulse is then delivered through resistor 222 turning GCS 152 back on to cause inverter circuit commutation. The minimum conduction interval time length is, therefore, clearly controlled by the values of the Zener voltage of Zener diode 240, resistor 216 and capacitor 214. The remaining elements of FIG. 3 not specifically described herein are utilized in their normal circuit functions.

Figure 4:
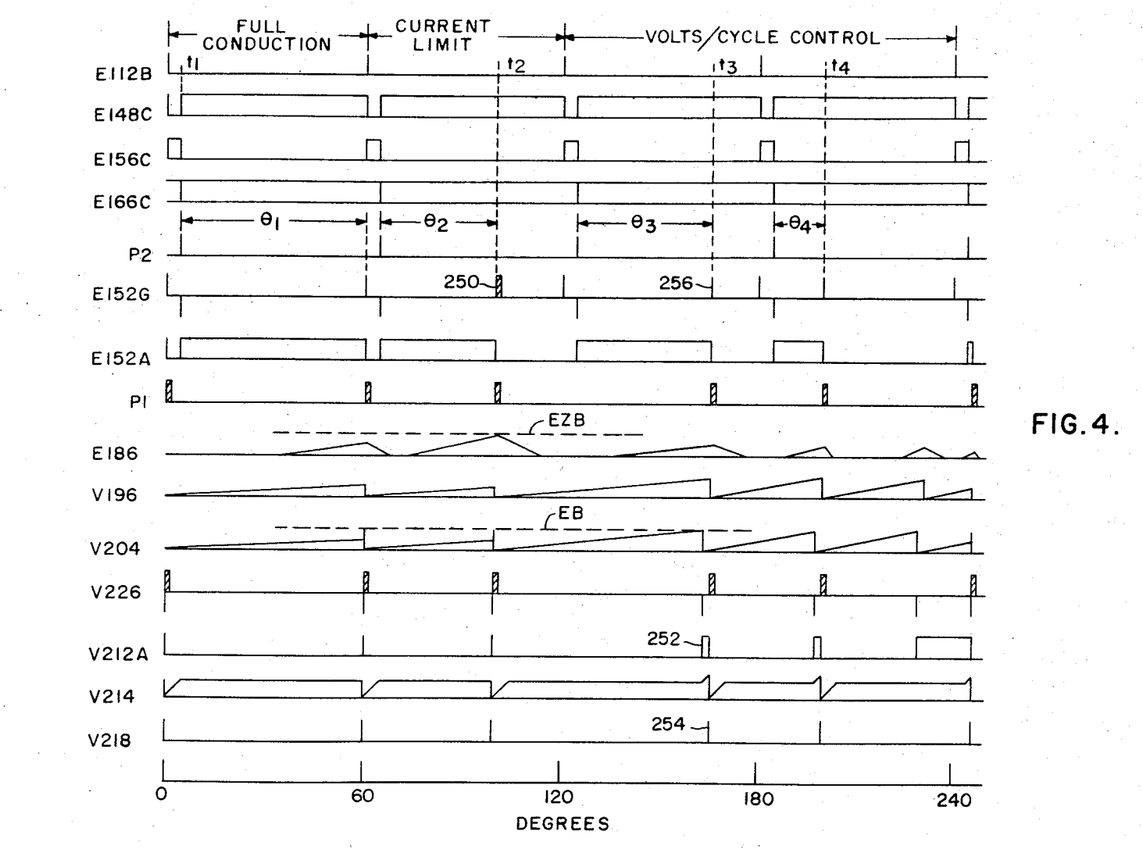
FIG. 4 illustrates waveforms appearing at various points in the circuit of FIG. 3.

The operation of the clock module of FIG. 3 for full conduction conditions, current limiting conditions, and volts-cycle control can best be understood by reference to FIG. 4 which illustrates waveforms appearing at various points in the circuit. Waveform E112B, comprising the voltage on the base of unijunction transistor 112, comprises a series of pulses of frequency determined by the setting of the potentiometer 132. The frequency of these pulses remains constant regardless of whether full conduction, current limiting, or volts-cycle control is employed.

It will be remembered that the output pulses from oscillator 108 are applied to the base of transistor 148 as well as the gate of GCS 152. Consequently, as shown by waveform E148C, the voltage on the collector of transistor 148 drops when a pulse is delivered from the oscillator 108; and, at the same time, the pulse applied to the gate of GCS 152 (i.e., waveform E152G in FIG. 4) causes the anode voltage of the GCS 152 to drop as shown by waveform E152A. This drop in anode voltage of the GCS 152, in turn, causes an output pulse $P_1$ to be delivered from the transistor 176.

Through the coupling effect of capacitor 154 previously described, the transistor 156 is forced to turn off and will stay off until the capacitor 154 becomes discharged at time $t_1$. Hence, the voltage on the collector of transistor 156 will appear as waveform E156C in FIG. 4. This waveform comprises a series of pulses which occur each time a pulse is delivered by the unijunction transistor 112; and these pulses are also fixed in frequency regardless of other circuit conditions.

It will be remembered that the capacitor 160 becomes charged after capacitor 154 discharges and transistors 156 and 148 return to the conducting and blocking states, respectively. This action momentarily turns on transistor 156 as shown by waveform E166C which comprises the voltage on the collector of transistor 166. The pulses in waveform E166C, through transistor 168, produce pulses $P_2$ shown in FIG. 4. These $P_2$ pulses appear on lead 170 of FIG. 3 and are fixed in frequency. At time $t_1$, the pulse in waveform E166C at the output of transistor 166 is also applied through capacitor 172 to the gate of GCS 152 (waveform E152G), thereby causing the anode voltage of GCS 152 to rise as shown by waveform E152A.

During the full conduction conditions shown in FIG. 4, the voltage will build up across the Zener diode 186 as shown by waveform E186; however this voltage will never reach the breakdown voltage of the Zener diode. At the same time, the voltage across capacitor 196 will also build up as shown by waveform V196; but the magnitude of the voltage across this capacitor will not be high enough to break down the Shockley diode 204, the breakdown voltage being indicated by the dotted line EB on waveform V204 which illustrates the voltage across the Shockley diode.

The output of transistor 176 comprising pulses $P_1$ are also applied to the gate of GCS 212 as indicated by waveform V212G. Consequently, a positive pulse is delivered at the anode of GCS 212 as indicated by waveform V212A. This, however, has no effect on the circuit at this time. The voltage across capacitor 214 appears as V214 in FIG. 4, and that on the base of transistor 218 appears as V218.

Let us now consider the conditions wherein current limiting is in effect as, for example, where excessive output currents occur during start-up of the motor. Under these conditions, the voltage across the Zener diode 186 (waveform E186 in FIG. 4) will reach the Zener breakdown voltage identified as EZB at time $t_2$. Consequently, the Zener diode 186 will conduct and apply a pulse 250 to the gate of GCS 152 as illustrated by waveform E152G. This pulse 250 causes the GCS anode voltage E152A to drop, whereupon a $P_1$ pulse is produced at the output of transistor 176. In this process, the conduction interval (i.e., the time between successive pulses $P_2$ and $P_1$) is reduced from $\theta_1$ for full conduction to $\theta_2$ during current limiting conditions. Consequently, the conduction interval $\theta$ will also be reduced as shown in FIG. 2 to reduce the overall voltage output to the motor.

Now, when volts/cycle control is being utilized, the voltage across capacitor 196 (waveform V196) will reach the point where the voltage across the Shockley diode 204 will cause it to break down at time $t_3$ shown in FIG. 4. When the breakdown voltage of Shockley diode 204 is reached, the capacitor 196 discharges as shown by waveform V204, and the secondary winding 208 of transformer 206 supplies a pulse to the base of GCS 212, whereby an output pulse 252 appears in waveform V212A due to cut-off of the normally conducting GCS 212. Since transistor 166 and GCS's 212 and 152 are all cut-off, the capacitor 214 becomes quickly charged as shown by waveform V214, thereby causing unijunction transistor 218 to turn on as shown by pulse 254 in waveform V218. With transistor 218 turned on, a pulse is supplied via diode 220 and resistor 222 to the gate of GCS 152 (i.e., pulse 256 in waveform E256G). This causes the GCS 152 to turn on such that its anode voltage E152A falls. At the same time, the transistor 176 is cut-off, whereby a $P_1$ pulse is produced. The effect, of course, is that the conduction interval $\theta_3$ has again been reduced with respect to the full conduction period $\theta_1$.

Again, should the capacitor 196 charge even more rapidly, the Shockley diode 204 will break down more quickly after the occurrence of a $P_2$ pulse at time $t_4$, whereby the conduction interval $\theta_4$ is shortened to a greater extent.

Figure 5:
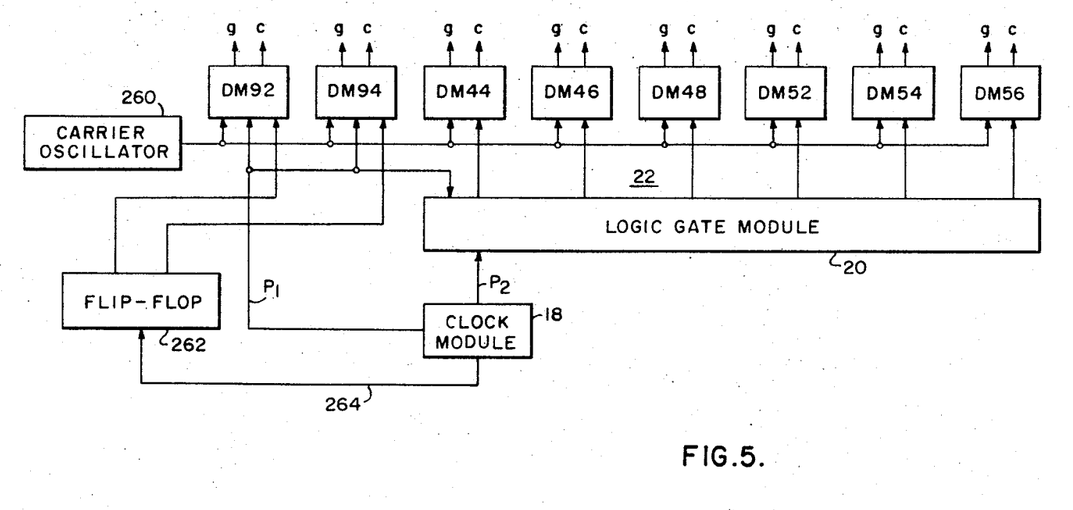
FIG. 5 is a block diagram of the logic gate and drive modules of the system of FIG. 1.

The manner in which the control pulses $P_1$ and $P_2$ actuate the logic gate module 20 and logic drive module 22 shown in FIG. 1 is fully described in our copending application Ser. No. 520,498, filed Jan. 13, 1966 (WE–36,845) and assigned to the assignee of the present application. However, a simplified block diagram of the logic and drive modules is shown in FIG. 5. The drive module 22 comprises eight separate and independent modules, one for each of the thyristors used in the commutation circuit 12 and inverter circuit 14. The individual drive modules are identified as DM92 through DM56. Drive module DM92, for example, is provided with output leads identified as $g$ and $c$ connected to the gate and cathode, respectively, of the thyristor 92 in commutation circuit 12. Similarly, drive module DM94 is provided with output leads $g$ and $c$ connected to the gate and cathode, respectively, of the thyristor 94.

Each of the individual drive modules DM92 through DM56 is supplied with oscillatory voltage from a carrier oscillator 260. The output of the carrier oscillator 260 is rectified in each of the individual drive modules DM92 through DM56 and applied between the respective gates and cathodes of the thyristor as the current waveforms 44A–56A shown in FIG. 2.

The drive modules 92 and 94 are utilized to derive the pulses 92A and 94A shown in FIG. 2. Note that the modules DM92 and DM94 have applied thereto the pulses $P_1$ from the clock module 18. Also connected to the modules DM92 and DM94 are the opposite sides or outputs of a flip-flop circuit 262. The input to the flip-flop circuit on lead 264 may, for example, comprise the output of oscillator 108 (i.e., waveform E112B of FIG. 4) such that drive module DM92 will be enabled during one 60° period of conduction; whereas drive module DM94 will be enabled on the other half cycle. The pulses $P_2$, of course, occur during every 60° cycle and are applied to both of the modules DM92 and DM94 during each 60° cycle. However, since the respective modules DM92 and DM94 are enabled only during every other 60° cycle of operation, a pulse 92A will appear at the output of module DM92 alone during one 60° cycle; whereas a pulse 94A will appear at the output of module 94 during the next successive 60° cycle.

The pulses $P_2$ are applied from the clock module 18 to the logic gate module 20. As can be seen from the aforesaid copending application Ser. No. 520,498, the logic gate module insures that, as illustrated by waveforms 44A–56A of FIG. 2, there will be gate currents applied to three thyristors in the inverter circuit 14 of FIG. 1 during each 60° cycle of operation. Furthermore, two of the three thyristors will conduct during the entire 60° cycle; whereas the third will conduct over a period of time determined by the position of a $P_2$ pulse. The position of the $P_2$ pulse, in turn, varies as the angle $\theta$, and in this manner the power output from the inverter circuit can be controlled in the manner described above.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In a system for supplying alternating current to an electrical motor by means of an inverter circuit, the combination of means in a closed loop regulating system for generating two pulsed waveforms in which the phase difference between pulses in the two waveforms determines the voltage output of the inverter circuit, and means responsive to the voltage appearing at the input to said motor for varying the phase difference between the pulses in the two waveforms to thereby maintain the sum of the inverter output voltage and the voltage regenerated by the motor constant regardless of motor speed and load.

2. The system of claim 1 including means responsive to the magnitude of the current flowing into the motor for reducing the phase difference between said pulses and the voltage output of the inverter when the input current to the motor exceeds a predetermined maximum value.

3. In a system for supplying three-phase alternating current power to a three-phase electrical motor by means of an inverter circuit in which the inverter circuit conduction period during a portion of a 60° cycle of operation of the motor is determined by the phase lag between pulses in two pulsed waveforms in a closed loop regulating system; the combination of apparatus for varying the phase lag between said pulses to maintain the sum of the inverter output voltage and the voltage regenerated by the motor constant regardless of motor speed and load, said apparatus comprising:

means for generating a voltage which varies in magnitude as a function of the line-to-line input voltage to the motor, which line-to-line voltage comprises said inverter voltage and the voltage regenerated by the motor, capacitor means for integrating said voltage generated by said last-named means, a pulse generator, means for deriving one of said pulsed waveforms from the output of said pulse generator such that the frequency of, and spacing between, pulses in said one waveform are fixed, means for causing a pulse to be generated in said other waveform after the occurrence of a pulse in said one waveform when said integrated voltage reaches a predetermined maximum value before the occurrence of the next pulse in said one waveform, means for causing a pulse to be generated in said other waveform upon the occurrence of a pulse in said one waveform whenever a pulse has not been previously generated by said last-mentioned means between the occurrence of two pulses in said one waveform, and means for causing said inverter circuit to conduct current to said motor between the occurence of a pulse in said one waveform and the occurrence of a succeeding pulse in said other waveform.

4. The apparatus of claim 3 including means for generating a voltage which varies in magnitude as a function of the magnitude of the current supplied to said motor by said inverter circuit, and means for causing a pulse to be generated in said other waveform after the occurrence of a pulse in said one waveform when the magnitude of said voltage proportional to current exceeds a predetermined maximum value.

5. The apparatus of claim 4 wherein said means for causing a pulse to be generated in said other waveform includes a Zener diode which breaks down when said predetermined maximum voltage magnitude is reached.

6. The apparatus of claim 3 wherein said capacitor means is connected in series with a Shockley diode, such that the Shockley diode will break down when said integrated voltage reaches said predetermined maximum value.

7. The apparatus of claim 3 including means for varying the output frequency of pulses from said pulse generator to thereby vary the speed of said motor.

8. The apparatus of claim 3 including means for discharging said capacitor means at the end of each 60° cycle portion of operation of the motor if said capacitor means has not been previously discharged during said 60° cycle.

9. The apparatus of claim 3 wherein said means for generating a voltage which varies in magnitude as a function of the line-to-line input voltage to the motor comprises a rectifier connected directly to the output of said inverter.

10. The apparatus of claim 4 wherein said means for generating a voltage which varies in magnitude as a function of the current supplied to said motor comprises rectifying means inductively coupled to the output of said inverter by current transformers.

References Cited

UNITED STATES PATENTS

| 3,344,326 | 9/1967 | Risberg | 318—230 |
| 3,346,794 | 10/1967 | Stemmler | 318—227 |
| 3,372,323 | 3/1968 | Guyeska | 318—230 |

ORIS L. RADER, *Primary Examiner.*

G. Z. RUBINSON, *Assistant Examiner.*

U.S. Cl. X.R.

318—230, 231